J. P. JAYME.
SHARPENING DEVICE FOR LAWN MOWERS.
APPLICATION FILED JULY 7, 1910.

990,559.

Patented Apr. 25, 1911.

WITNESSES
Stephen Wach.
Geo V Weldon

INVENTOR
John Philip Jayme
By Fred'k W. Winter
Attorney

UNITED STATES PATENT OFFICE.

JOHN PHILIP JAYME, OF PITTSBURG, PENNSYLVANIA.

SHARPENING DEVICE FOR LAWN-MOWERS.

990,559.  Specification of Letters Patent.  Patented Apr. 25, 1911.

Application filed July 7, 1910. Serial No. 570,794.

*To all whom it may concern:*

Be it known that I, JOHN PHILIP JAYME, a resident of Pittsburg, in the county of Allegheny and State of Pennsylvania, have invented a new and useful Improvement in Sharpening Devices for Lawn-Mowers, of which the following is a specification.

This invention relates to a device for sharpening the revolving blades of lawn mowers and other articles.

The object is to provide a sharpener for the purpose stated which is cheap to manufacture, which can be readily applied to any standard lawn mower, which is strong and durable, and by means of which the edges of the cutting blades may be evenly and uniformly sharpened.

The invention comprises the construction and arrangement hereinafter described and claimed.

Figure 1:
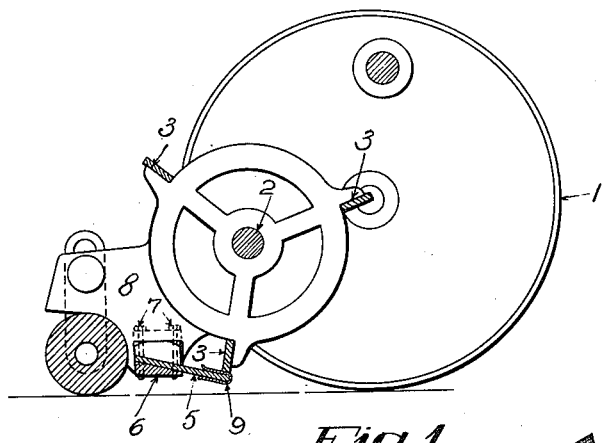
Figure 2:
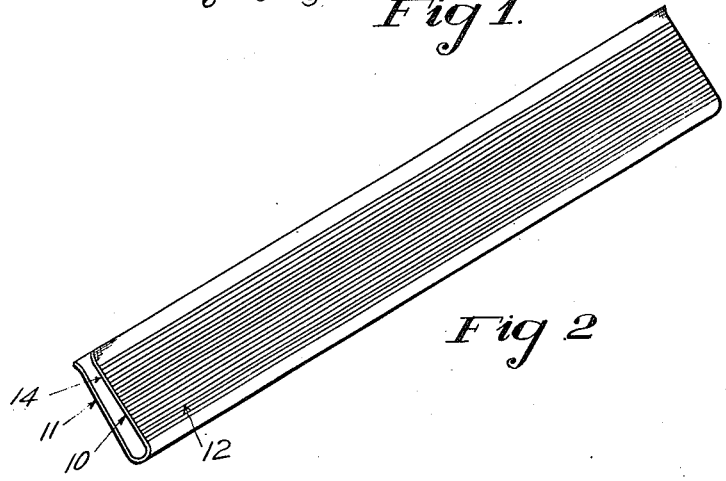
Figure 3:
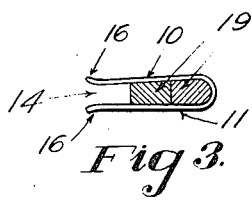
Figure 4:
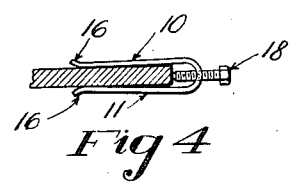

In the accompanying drawing Figure 1 is a sectional view through a lawn mower showing the sharpening device applied thereto; Fig. 2 is a perspective view of the sharpening device detached; and Figs. 3 and 4 are transverse sections through the same illustrating two methods for the adjustment thereof.

Fig. 1 shows the general outline and arrangement of the main parts of a standard lawn mower, the same comprising the main wheel 1, which will be geared as usual to the counter shaft or spindle 2, the latter carrying the revolving cutting blades 3, which are usually spiral in form. The stationary knife or cutter is shown at 5, and this also may be of the usual construction, such as a straight flat plate with either a comparatively square or a beveled edge. It is carried by the usual cross bar 6, which in practically all lawn mowers is adjustable, such as by means of bolts 7 passing through the bar 6 and lugs on the side frames 8 of the mower, such adjustment being provided to vary the position of the edge of the stationary knife with reference to the edges of the revolving knives, to compensate for the wearing off of the knives.

The sharpening device 9 is formed from a thin plate, strip or sheet of steel file cut on its surface and adapted to have the edges of the revolving blades contact therewith and to be sharpened thereby. In its preferred form the sharpener is formed from a strip, plate or sheet of sufficient width to be bent practically double as shown in the drawing, the same comprising the upper plate or limb 10 and the lower plate or limb 11, the former being file cut on its upper surface, as shown at 12, and the latter on its lower surface. These two limbs lie in substantial parallelism so as to form between them a gap or throat 14 for receiving the stationary knife 5, said cutter being held in position by slipping over said stationary knife and frictionally engaging the same. Preferably the throat between the two limbs of the cutter is contracted slightly toward the free edges of said limbs, as shown, and the plate as a whole is resilient so that it grips the stationary knife with a strong grip. The extreme free edges 16 of the two limbs are turned very slightly outwardly, so as to form a flaring entrance to enable the sharpening device to be slipped readily upon the stationary knife.

The sharpening device is in effect a file plate, and the sharpening is effected by first adjusting the bolts 7 so as to drop the bar 6 downwardly slightly to compensate for the thickness of the file plate, and then slipping the file plate over the free edge of the stationary cutter, after which the revolving knives can be rotated either by hand or by running the mower along the floor or ground in the ordinary way, or upside down, said blades as they revolve contacting with the file plate and being sharpened thereby. This file plate is readily reversible so that both surfaces thereof are available. It is also of sufficient width so that it can be adjusted on the stationary knife to present different faces for the contact of the revolving knives 3. The revolving knives contact with the file surface along only a narrow zone, so that by making the file plate comparatively wide successive zones may be presented to the revolving knives. This adjustment may be effected in various ways, such as by means of set screws 18 passing through threaded openings in the curved forward edge of the file bar, as shown in Fig. 4, or by means of filling blocks 19, as shown in Fig. 3. These filling blocks may be put in by the user or may be supplied with the device when sold. The filling blocks may be taken out from time to time and others of a different width put therein so as to present to the revolving blades different longitudinal zones on the surface of the sharpening device.

The file cutting on the surface of the plate 9 may be of design usual on metal files, that is, in diagonal or diamond cuts, or it may be in straight lines lengthwise of said plate, the latter cutting being shown on the drawings.

The device described can be cheaply and economically manufactured, as it can be made of comparatively thin steel strips, plates or sheets, say, 16 gage, or even thinner. It is of light weight, and this is also a factor in economy. It can be readily applied to the stationary knife, and when applied adheres firmly thereto. It also is very durable, does not break, and on account of the adjustability it has a comparatively long life.

What I claim is:

1. A device for sharpening cutter blades on lawn-mowers and the like, comprising a metal plate provided with a file cut surface, and a spring member spaced from the opposite surface of said plate, said device being arranged to receive the fixed cutter blade between said plate and said spring member, with the plate bearing solidly against one face of the fixed cutter blade and the spring member gripping the opposite face thereof.

2. A device for sharpening cutter blades on lawn mowers and the like comprising a resilient metal plate bent longitudinally so as to form a spring member of itself, and provided with file cut outer surfaces, said device being arranged to clasp and frictionally engage the fixed cutter blade of the lawn mower.

3. A device for sharpening cutter blades on lawn mowers and the like comprising a resilient metal plate bent longitudinally so as to form a spring member of itself, and provided with file cut outer surfaces, the throat between the limbs of said plate being slightly narrower toward the free edges of said limbs and flaring slightly at the extreme edges and adapted to fit over the fixed blade of the mower.

4. A device for sharpening cutter blades of lawn mowers and the like comprising a steel plate bent longitudinally to form two parts in substantial parallelism but spaced apart to fit tightly on the fixed cutter blade of the mower, the outer faces of said plate being file cut, and means for adjusting said plate transversely to the longitudinal axis and parallel to the face of the fixed cutter blade.

5. A device for sharpening cutter blades for lawn mowers and the like comprising a steel plate bent longitudinally to form two limbs in substantial parallelism but spaced apart to fit the fixed cutter blade of the mower, the outer faces of said plate being file cut, and adjusting filling blocks interposed between the limbs of said plate and between the edge of the fixed cutter blade and the closed edge of said plate.

In testimony whereof, I have hereunto set my hand.

JOHN PHILIP JAYME.

Witnesses:
  JAS. L. WELDON,
  F. W. WINTER.